United States Patent

Versnel et al.

[11] 4,067,930
[45] Jan. 10, 1978

[54] FLAME-RETARDANT COMPOSITION

[75] Inventors: John Versnel, Plainsboro; Joseph Green, East Brunswick, both of N.J.

[73] Assignee: Cities Service Company, Tulsa, Okla.

[21] Appl. No.: 745,029

[22] Filed: Nov. 26, 1976

[51] Int. Cl.² .................................................. C08K 5/02
[52] U.S. Cl. ............................ 260/880 R; 260/45.7 R
[58] Field of Search ................... 260/45.7 R, 45.75 B, 260/880 R

[56] References Cited

U.S. PATENT DOCUMENTS

| 3,382,204 | 5/1968 | Gouinlock | 260/33.8 EP |
| 3,403,036 | 9/1968 | Hindersinn | 260/33.8 UA |
| 3,723,383 | 3/1973 | Cyba | 260/45.75 B |
| 3,950,456 | 4/1976 | Newcombe | 260/45.75 B |
| 3,976,722 | 8/1976 | Carlson | 260/45.75 B |

*Primary Examiner*—Paul R. Michl
*Attorney, Agent, or Firm*—Patricia J. Hogan

[57] ABSTRACT

Flame-retardant compositions having an excellent balance of properties are obtained by flame-retarding rubber-modified polystyrenes with a mixture of about 55–95% by weight of a first flame retardant corresponding to the formula:

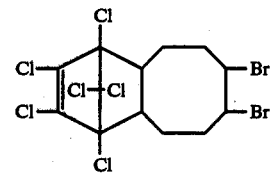

and about 45–5% by weight of a second flame retardant corresponding to the formula:

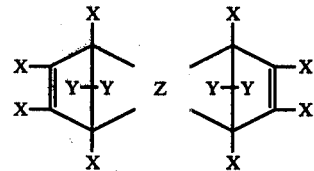

wherein X is bromo or chloro, Y is halo, hydrogen, or an alkyl, haloalkyl, alkoxy, or haloalkoxy group, and Z is a tetravalent hydrocarbon group containing 4–20 carbon atoms.

12 Claims, No Drawings

FLAME-RETARDANT COMPOSITION

BACKGROUND OF THE INVENTION

1. Field of the Invention

This invention relates to flame-retardant compositions and more particularly relates to such compositions comprising a rubber-modified polystyrene.

2. Description of the Prior Art

It is known that normally flammable polymers can be rendered flame-retardant by the incorporation of the flame retardants of British Pat. No. 1,377,282 or the flame retardants of U.S. Pat. Nos. 3,382,204 and 3,403,036, the former being brominated monoadducts of polyhalocyclopentadienes and multi-unsaturated hydrocarbons, and the latter being diadducts of polyhalocyclopentadienes and multi-unsaturated hydrocarbons. However, neither type of flame retardant has proved to be satisfactory for incorporation into rubber-modified polystyrene compositions. The monoadducts flame-retard the compositions efficiently but lower the heat distortion and softening temperatures more than is sometimes acceptable; the diadducts, which have less deleterious an effect on heat distortion and softening temperatures, have poor efficiency as flame retardants. It would be desirable to find a flame retardant or flame retardant system capable of functioning efficiently but providing compositions having a good balance of properties.

SUMMARY OF THE INVENTION

An object of this invention is to provide novel flame-retardant rubber-modified polystyrene compositions.

Another object is to provide such compositions having a good balance of properties.

These and other objects are attained by intimately mixing a rubber-modified polystyrene with a flame-retarding amount of a mixture of about 55-95% by weight of a first flame retardant corresponding to the formula:

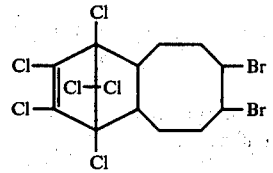

and about 45-5% by weight of a second flame retardant corresponding to the formula:

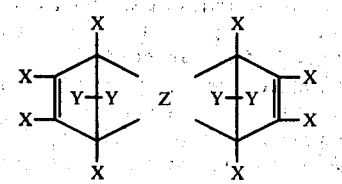

wherein X is bromo or chloro, Y is halo, hydrogen, or n alkyl, holoalkyl, alkoxy, or haloalkoxy group, and Z is a tetravalent hydrocarbon group containing 4-20 carbon atoms.

DESCRIPTION OF THE PREFERRED EMBODIMENTS

The rubber-modified polystyrene that is flame-retarded in accordance with the present invention can be any of the compositions that are conventionally known as impact polystyrenes, impact-resistant polystyrenes, or toughened polystyrenes. As is well known, such compositions essentially consist of polystyrene that has been physically and/or chemically combined with a minor proportion, usually about 1-25% by weight, of one or more natural or synthetic rubbers, usually a diene rubber. The rubber component of such compositions is ordinarily a substantially linear or branched polymer of a conjugated diene, such as butadiene, isoprene, etc., optionally containing up to about 50% by weight of one or more randomly copolymerized monomers, such as styrene, acrylonitrile, methyl methacrylate, etc. However, it is sometimes a rubbery diene block polymer, such as a polystyrene-polybutadiene polystyrene block copolymer. All such rubber-modified polystyrenes are utilizable in the practice of the invention.

As indicated above, the rubber-modified polystyrene is flame-retarded with a mixture of two flame retardants, one of which is a dibrominated adduct of hexachlorocyclopentadiene and cyclooctadiene, i.e., a compound corresponding to the formula:

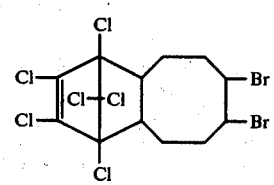

and the other of which is a diadduct of a polyhalocyclopentadiene and a multi-unsaturated hydrocarbon, i.e., a compound corresponding to the formula:

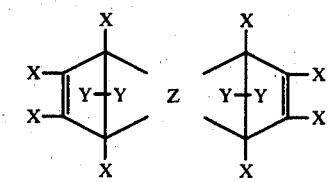

The first flame retardant, i.e., the monoadduct, constitutes about 55-95%, preferably about 60-80%, and most preferably about 70% by weight of the flame retardant mixture. The second flame retardant, i.e., the diadduct, constitutes, respectively, about 45-5%, preferably about 40-20%, and most preferably about 30% by weight of the flame retardant mixture.

Both flame retardants, of course, are well known, the first being one of the flame retardants of British Pat. No. 1,377,282, and the second being the type of flame retardant taught in U.S. Pat. Nos. 3,382,204 and 3,403,036. As is also known, the second flame retardant is essentially a diadduct of:

1. a polyhalocyclopentadiene, such as hexachlorocyclopentadiene; hexabromocyclopentadiene; 5,5-difluorotetrachlorocyclopentadiene; 5,5-dibromotetrachlorocyclopentadiene; 5,5-dihydrotetrachlorocyclopentadiene; 5-methylpentachlorocyclopentadiene; 5-methyl-5-hexyltetrabromocyclopentadiene; 5,5-didecyltetrachlorocyclopentadiene; 5,5-bis(chloromethyl)tetrachlorocyclopentadiene; 5-bromoethylpentabromocyclopentadiene; 5,5-dimethoxytetrachlorocyclopentadiene; 5-decoxypentachlorocyclopentadiene; 5,5-bis(chloromethoxy)tetrachlorocyclopentadiene, etc., with 2. a multi-unsaturated acyclic or cyclic hydrocarbon, such as butadiene-1,3; dimethylbutadiene; hexadiene-1,5; octadiene-1,7; dodecadiene-1,11; cyclopentadiene; methylcyclopentadiene; dicyclopentadiene; cyclohexadiene; cyclooctadiene-1,5; cyclodecadiene; cyclododecadiene, etc.

In these diadducts the two polyhalocyclopentadiene moieties may be the same or different but are usually the same, and any organic group represented by a Y of the formula usually contains 1-10 carbon atoms.

Any such diadduct corresponding to the above formula may be used as the second flame retardant in the practice of the present invention, but the preferred second flame retardants are those having melting points above 250° C. The most preferred second flame retardant is the diadduct of hexachlorocyclopentadiene and cyclooctadiene-1,5 i.e., a compound corresponding to the formula:

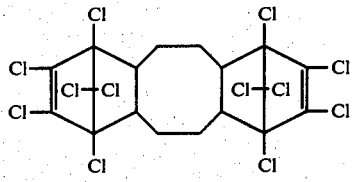

To prepare the compositions of the invention, the rubber-modified polystyrene is intimately mixed with the flame retardant system and any optional additives, such as fillers, pigments, plasticizers, stabilizers, lubricants, synergists, etc., in any suitable manner, e.g., by the use of an extruder, a two-roll mill, or a Banbury mixer, so as to prepare a composition containing a flame-retarding amount of the flame retardant mixture. Ordinarily the concentration of flame retardant mixture in the composition is about 1-25%, based on the combined weights of rubber-modified polystyrene and flame retardant mixture. However, larger amounts may be employed if desired. The compositions of the invention preferably contain about 9-15%, most preferably about 11-13%, of the flame retardant mixture, based on the combined weights of rubber-modified polystyrene and flame retardant mixture.

Although the flame retardant mixture of the invention is fairly efficient, it is frequently desirable to enhance its effectiveness by including one or more synergists, such as the synergists conventionally used with halogenated flame retardants. These synergists include, e.g., zinc borate, sodium tetraborate, lead arsenate, etc., but are more commonly compounds, such as oxides, sulfides, or organic acid salts, of antimony, arsenic, or bismuth. The preferred synergist for use in the compositions of the invention is antimony trioxide. When a synergist is employed, it is usually used in an amount such as to provide a flame retardant/synergist weight ratio of about 1-4.5/1, preferably about 2/1.

The flame retardant mixtures of the invention are particularly advantageous in that they provide rubber-modified polystyrene compositions having an excellent balance of flame retardancy and other properties, such as impact strength, heat distortion temperature, softening temperature, UV stability, and thermal stability. A particularly unexpected advantage of the mixture is that they provide a higher degree of flame retardancy than would be predicted from the levels of flame retardancy obtained with comparable amounts of the individual components of the flame retardant mixtures.

The following examples are given to illustrate the invention and are not intended as a limitation thereof. Unless otherwise specified, quantities mentioned are quantities by weight.

EXAMPLE I — CONTROL

Blend 89 parts of a commercial polybutadiene rubber-modified polystyrene with 11 parts of the dibrominated monoadduct of hexachlorocyclopentadiene and cyclooctadiene-1,5 (hereinafter designated as the monoadduct), 5.5 parts of antimony trioxide, 0.25 part of dibutyl tin maleate, 0.25 part of calcium stearate, 0.25 part of dilauryl thiodipropionate, and 0.12 part of a hindered phenol stabilizer. Test the composition for oxygene index. The composition has an oxygene index of 24.5.

EXAMPLE II — CONTROL

Repeat Example I except for replacing the 11 parts of the monoadduct with 11 parts of the diadduct of hexachlorocyclopentadiene and cyclooctadiene-1,5 (hereinafter designated as the diadduct). The composition has an oxygen index of only 23.5.

EXAMPLE III

Prepare five compositions by repeating Example I except for replacing the 11 parts of the monoadduct with, respectively, (a) a mixture of 10 parts of the monoadduct and one part of the diadduct, (b) a mixture of 9.5 parts of the monoadduct and 1.5 parts of the diadduct, (c) a mixture of 9 parts of the monoadduct and 2 parts of the diadduct, (d) a mixture of 7 parts of the monoadduct and 4 parts of the diadduct, and (e) a mixture of 6 parts of the monoadduct and 5 parts of the diadduct. Project the expected oxygen indices of the compositions from the values obtained in Examples I and II, and test for actual oxygen indices. A comparison of the projected and actual oxygen indices of the compositions is shown below.

| Monoadduct/Diadduct | Projected O.I. | Actual O.I. |
|---|---|---|
| 10/1 | 24.4 | 25.2 |
| 9.5/1.5 | 24.35 | 25.5 |
| 9/2 | 24.3 | 25.2 |
| 7/4 | 24.15 | 24.5 |
| 6/5 | 24.05 | 24.2 |

EXAMPLE IV

Blend 88 parts of the commercial polybutadiene rubber-modified polystyrene of Example I with 9.6 parts of the monoadduct, 2.4 parts of the diadduct, 6 parts of antimony trioxide, 0.25 part of dibutyl tin maleate, 0.25 part of calcium stearate, 0.25 part of dilauryl thiodipropionate, and 0.12 part of a hindered phenol stabilizer. Test the composition for physical properties. The composition has an Izod impact strength of 6 kg. cm./cm., a heat distortion temperature of 78° C. at 18.6 kg./sq.cm., and a Vicat softening temperature of 94° C.

EXAMPLE V

Repeat Example IV except for replacing the flame retardant mixture with a mixture of 8.4 parts of the monoadduct and 3.6 parts of the diadduct. The composition has an Izod impact strength of 6.5 kg.cm./cm., a heat distortion temperature of 80° C. at 18.6 kg./sq.cm., and a Vicat softening temperature of 97° C.

EXAMPLE VI

Repeat Example IV except for replacing the flame retardant mixture with a mixture of 7.2 parts of a monoadduct and 4.8 parts of the diadduct. The composition has an Izod impact strength of 6 kg.cm./cm., a heat distortion temperature of 82° C. at 18.6 kg./sq.cm., and a Vicat softening temperature of 98° C.

As demonstrated above, compositions of the invention exhibit better flame retardancy than would be expected but still have good physical properties. Similar results are observed when the examples are repeated except for replacing the ingredients with materials taught to be their equivalents in the specification.

It is obvious that many variations may be made in the products and processes set forth above without departing from the spirit and scope of this invention.

What is claimed is:

1. A composition comprising (A) a rubber-modified polystyrene and (B) a flame-retarding amount of a mixture of about 55–95% by weight of a first flame retardant corresponding to the formula:

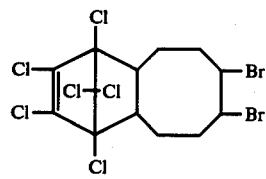

and about 45–5% by weight of a second flame retardant corresponding to the formula:

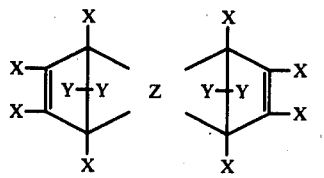

wherein X is bromo or chloro, Y is halo, hydrogen, or an alkyl, haloalkyl, alkoxy, or haloalkoxy group, and Z is a tetravalent hydrocarbon group containing 4–20 carbon atoms.

2. The composition of claim 1 wherein the second flame retardant is a compound in which Z is a tetravalent cyclic hydrocarbon group.

3. The composition of claim 2 wherein the second flame retardant corresponds for the formula:

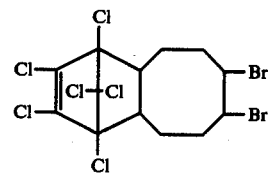

4. The composition of claim 1 wherein the second flame retardant is a compound in which Z is a tetravalent acyclic hydrocarbon group.

5. The composition of claim 1 wherein the second flame retardant constitutes about 20–40% by weight of the flame retardant mixture.

6. The composition of claim 5 wherein the second flame retardant constitutes about 30% by weight of the flame retardant mixture.

7. The composition of claim 1 containing a synergistic metal compound.

8. The composition of claim 7 wherein the synergistic metal compound is antimony trioxide.

9. The composition of claim 7 wherein the synergistic metl compound is used in an amount such as to provide a flame retardant/synergist weight ratio of about 1–4.5/1.

10. The composition of claim 1 wherein the concentration of the flame retardant mixture is about 9–15%, based on the combined weights of rubber-modified polystyrene and flame retardant mixture.

11. The composition of claim 10 wherein the concentration of the flame retardant mixture is about 11–13%.

12. A composition comprising (A) about 87–89 parts by weight of a rubber-modified polystyrene, (B) respectively, about 13–11 parts by weight of a mixture of about 70% by weight of a first flame retardant corresponding to the formula:

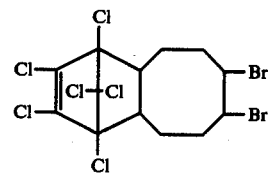

and about 30% by weight of a second flame retardant corresponding to the formula:

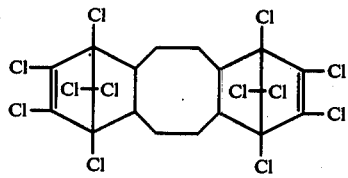

and (C) an amount of antimony trioxide such as to provide a flame retardant/antimony trioxide weight ratio of about 2/1.

* * * * *